(12) United States Patent
Lee et al.

(10) Patent No.: US 7,782,395 B2
(45) Date of Patent: Aug. 24, 2010

(54) APPARATUS AND METHOD FOR MOUNTING A PHOTOGRAPHING DEVICE

(75) Inventors: Kyeong-eun Lee, Changwon-si (KR); Mi-jeong Seong, Changwon-si (KR); Sang-hwan Oh, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 11/818,037

(22) Filed: Jun. 13, 2007

(65) Prior Publication Data

US 2008/0043139 A1 Feb. 21, 2008

(30) Foreign Application Priority Data

Jun. 28, 2006 (KR) ...................... 10-2006-0058895

(51) Int. Cl.
*H04N 5/225* (2006.01)
(52) U.S. Cl. ....................... 348/375; 348/335
(58) Field of Classification Search ................. 348/335, 348/340, 272
See application file for complete search history.

(56) References Cited

U.S. PATENT DOCUMENTS 6,741,286 B2 * 5/2004 Meek et al. ................. 348/370
6,977,783 B2 * 12/2005 Lung .......................... 348/340
7,333,146 B1 * 2/2008 Etoh .......................... 348/374
7,528,880 B2 * 5/2009 Yamaguchi et al. ......... 348/335
2001/0012073 A1 * 8/2001 Toyoda et al. ............... 348/335
2003/0137595 A1 * 7/2003 Takachi ...................... 348/340
2005/0007484 A1 * 1/2005 Tan et al. .................... 348/340
2006/0146170 A1 * 7/2006 Saito et al. .................. 348/340
2006/0245050 A1 * 11/2006 Uchida et al. ............... 359/391

FOREIGN PATENT DOCUMENTS

| JP | 2001-169191 A | 6/2001 |
| JP | 2006-081007 A | 3/2006 |

* cited by examiner

*Primary Examiner*—Gevell Selby
(74) *Attorney, Agent, or Firm*—Drinker Biddle & Reath LLP

(57) ABSTRACT

Provided are an apparatus and a method of mounting a photographing device capable of aligning the photographing device accurately when the photographing device is mounted. The apparatus for mounting the photographing device includes a base member including at least a lens unit; a photographing device converting light transmitted through the lens unit into an electric signal; an elastic pad disposed between the base member and the photographing device; and a fixing member supported by the base member to fix the photographing device.

24 Claims, 5 Drawing Sheets

1

APPARATUS AND METHOD FOR MOUNTING A PHOTOGRAPHING DEVICE

CROSS-REFERENCE TO RELATED PATENT APPLICATIONS

This application claims the benefit of Korean Patent Application No. 10-2006-0058895, filed on Jun. 28, 2006, in the Korean Intellectual Property Office, the disclosure of which is incorporated herein in its entirety by reference.

BACKGROUND OF THE INVENTION

1. Field of the Invention

The present invention relates to an apparatus and method for mounting a photographing device. More particularly, the present invention relates to an apparatus and method for mounting a photographing device that is capable of aligning the photographing device accurately.

2. Description of the Related Art

Recently, photographing apparatuses such as digital still cameras and digital video cameras, have been widely distributed. The photographing apparatuses generally include an optical system having a lens unit, a photographing device disposed on a side of the lens unit, an image processor processing electric signals emitted from the photographing device, and a memory storing photographed images.

Conventional photographing apparatuses operate as follows. When a user photographs a subject, image light of the subject passing through the lens unit is incident into the photographing device such as a charge coupled device (CCD), the photographing device converts the incident light into an electric image signal, the image processor processes the electric image signal, and the memory stores the photographed image.

In order to obtain images of high resolution, the photographing device should be set accurately. That is, when the photographing device is mounted, the photographing device is centered based on an optical axis of the lens unit, and is aligned appropriately in every directions. To do this, a mold member including the photographing device can be fabricated and coupled to a base member including the optical system using screws.

However, according to this conventional arrangement, additional space for coupling operation using the screws is required, and it is difficult to perform the centering and fine aligning of the photographing device when the photographing device is mounted. Thus, the resolution of the photographing device may be degraded.

SUMMARY OF THE INVENTION

The present invention provides an apparatus and method of mounting a photographing device accurately when the photographing device is mounted. An embodiment of the present invention provides an apparatus for mounting a photographing device. The structure includes: a base member including at least a lens unit, a photographing device for converting light transmitted through the lens unit into an electric signal, an elastic pad disposed between the base member and the photographing device, and a fixing member supported by the base member to fix the photographing device.

The base member may include a lens barrel, and the lens unit may be disposed in the lens barrel. At least one spring may be disposed between the base member and the fixing member. At least one filter may be disposed between the lens unit and the photographing device. The elastic pad may include a synthetic resin, and may be adhered to at least a part of a boundary of the photographing device. A heat dissipation plate may be disposed between the photographing device and the fixing member.

The base member may include at least one projection, and the fixing member includes at least one supporting portion which has an opening hooked by the projection. The base member may also include at least one boss protruding towards the fixing member, and the fixing member may include at least one installation hole inserted into the boss.

If the photographing device is temporarily fixed by the fixing member to the base member, the photographing device may be finally fixed to the base member by an adhesive. The adhesive may be an ultraviolet-ray curing adhesive. The fixing member may further include setting holes for adjusting the mounting position of the photographing device.

Another embodiment of the present invention provides a method of mounting a photographing device. The method includes the steps of preparing a base member including at least one lens unit, disposing a photographing device so that light of an image incident from the lens unit can be imaged on the photographing device, disposing an elastic pad between the lens unit and the photographing device, fixing a fixing member on the base member in order to temporarily fix the photographing device, and fixing the photographing device finally using an adhesive after adjusting the position of the photographing device so that the photographing device can function at an optimal resolution.

The method may further include the step of disposing at least one spring between the base member and the fixing member. If the base member includes at least one projection and the fixing member includes at least one supporting portion including openings corresponding to the projection, the opening may be hooked by the projection when fixing the fixing member to the base member.

The position of the photographing device may be adjusted so that the photographing device can function at the optimal resolution by forming setting holes on the fixing member and adjusting the position of the photographing device using the setting holes. The adhesive may be an ultraviolet-ray curing adhesive, and may be cured by ultraviolet rays in the final fixing process of the photographing device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
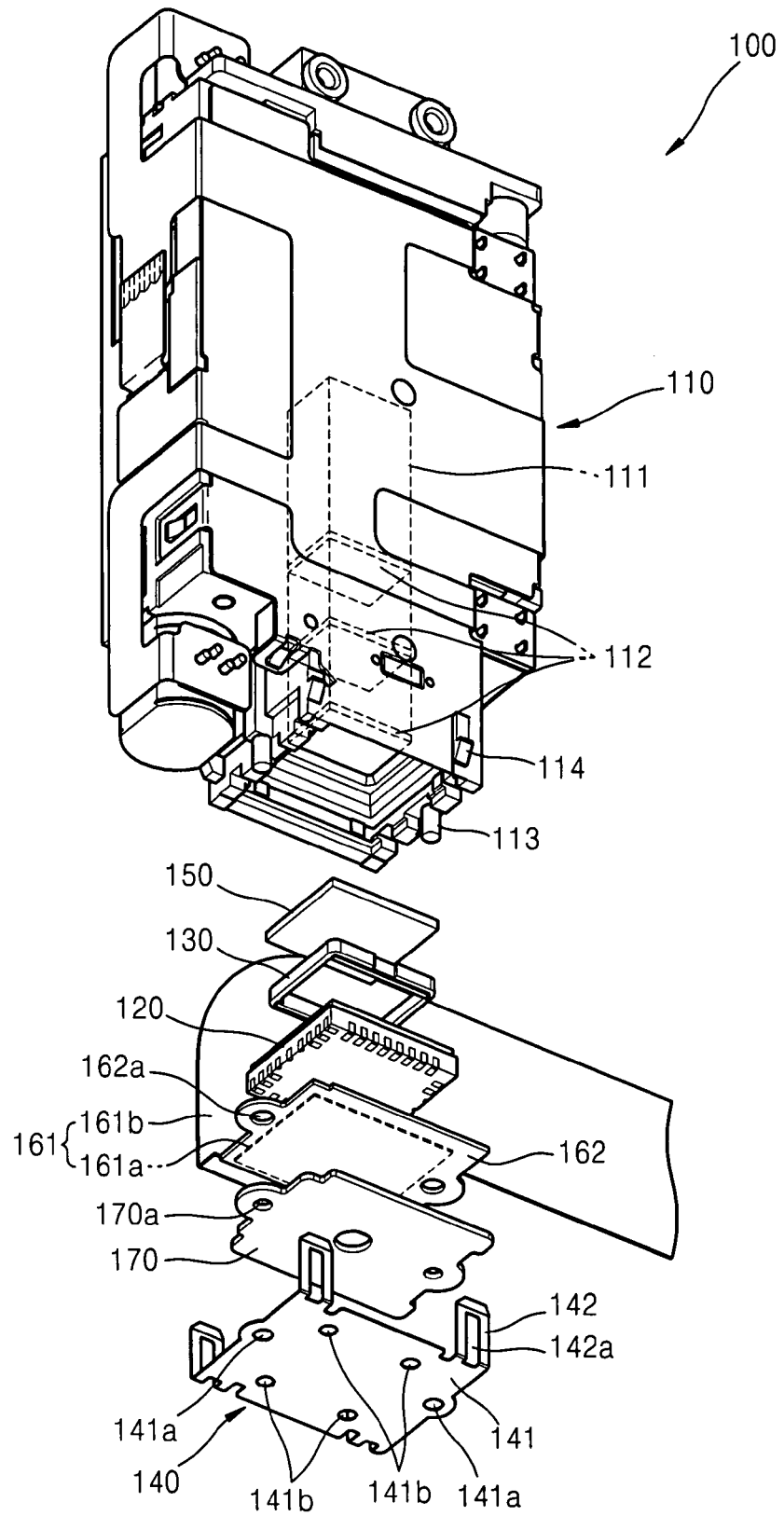
FIG. 1 is a schematic exploded perspective view of a photographing apparatus according to an embodiment of the present invention.
Figure 2:
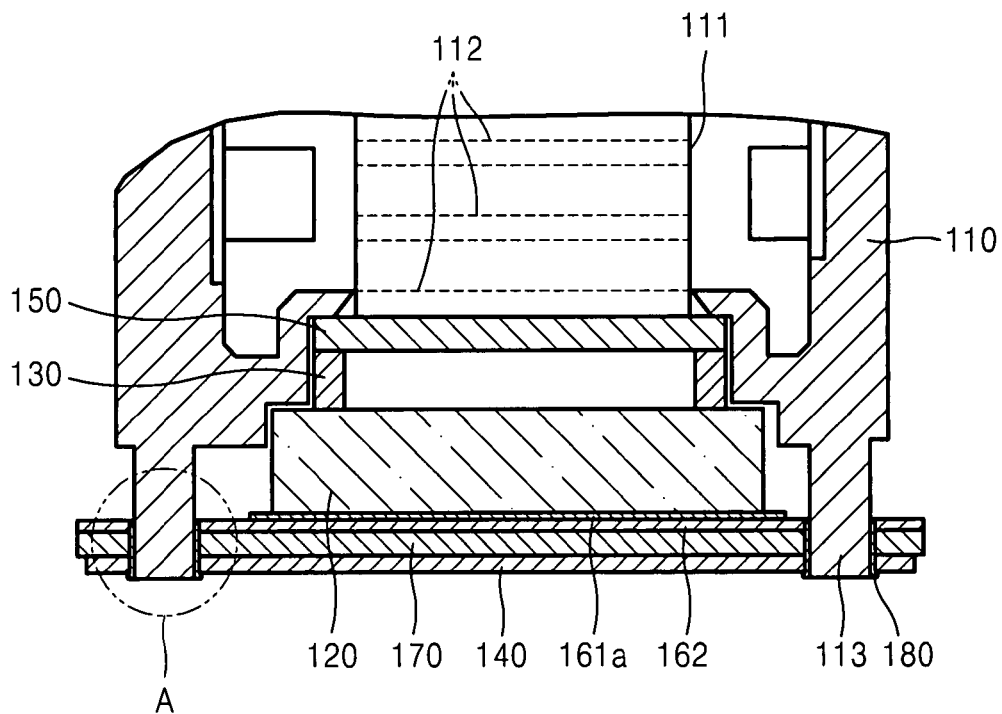
FIG. 2 is a schematic cross-sectional view of a structure for mounting a photographing device according to an embodiment of the present invention.
Figure 3:
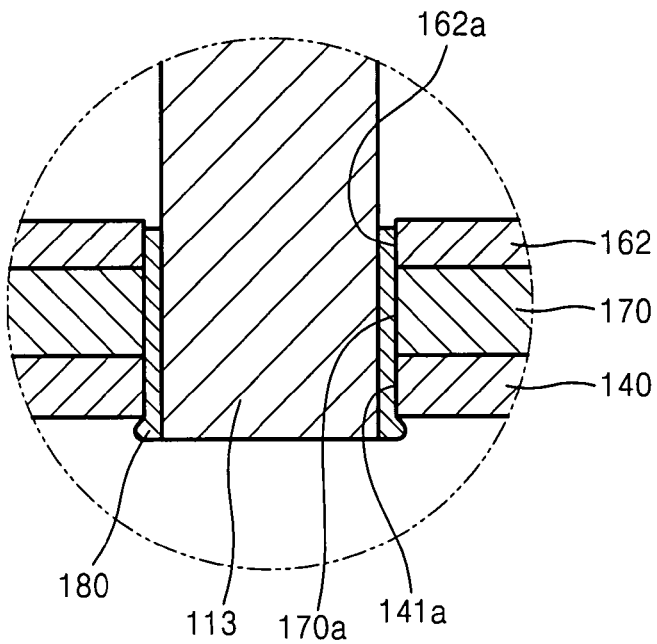
FIG. 3 is a schematic view of part A in FIG. 2.
Figure 4:
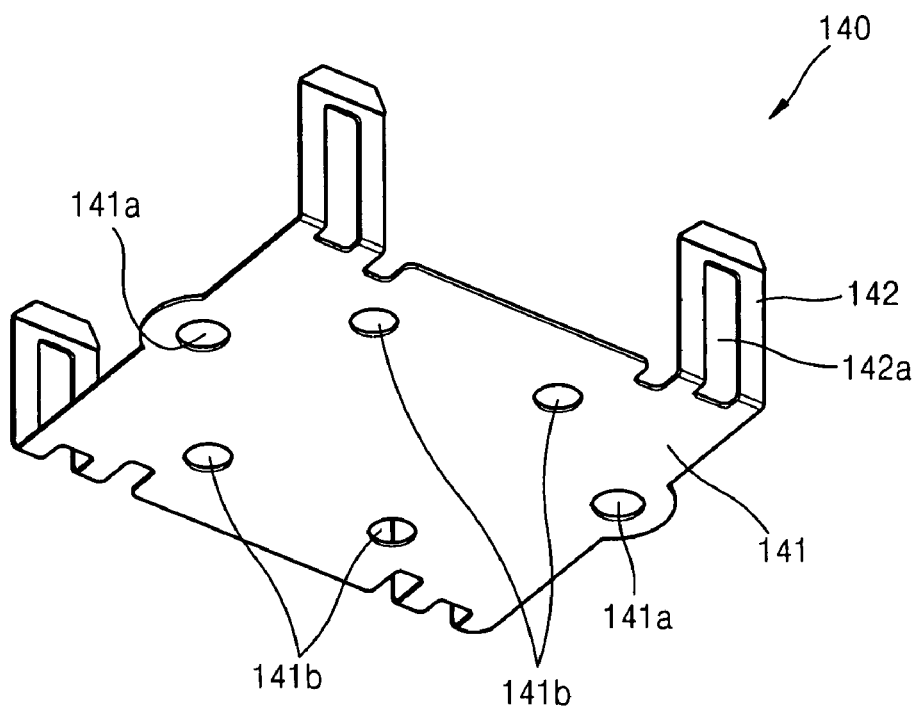
FIG. 4 is a schematic perspective view of a fixing member according to the embodiment of the present invention.

Referring to FIGS. 1 through 4, a photographing apparatus 100 according to an embodiment of the present invention includes a base member 110, a photographing device 120, an elastic pad 130, and a fixing member 140. The base member 110 includes a lens barrel 111, and the lens barrel 111 includes a lens unit 112. The lens unit 112 includes various lenses such as a zoom lens and a focusing lens, and an iris.

Two bosses 113 are symmetrically formed on a lower portion of the base member 110, and four projections 114 are formed on lower side surfaces of the base member 110. According to this embodiment, two bosses 113 are formed on the lower portion of the base member 110. However, the present invention is not limited to this type of arrangement. That is, any number of bosses can be formed on the lower portion of the base member 110 according to an embodiment of the present invention as long as the number is sufficient enough to guide and support the photographing device 120 and the fixing member 140. For example, three or more bosses may be formed on the lower portion of the base member 110.

According to this embodiment, four projections 114 are formed on the lower side surfaces of the base member 110. However, if the projections formed on the lower side surfaces of the base member 110 can support the fixing member 140, the number of projections does not matter. For example, two, three, five, six, or more projections may be formed on the lower portion of the base member 110. The light incident from the outside passes through the lens unit 112 and is imaged on the photographing device 120, and the CCD is used as the photographing device 120. In this embodiment, the CCD is used as the photographing device 120. However, a complementary metal oxide semiconductor (CMOS) may be used as the photographing device, or other image sensors can be used as the photographing device. If the CMOS is used as the photographing device, the CMOS can convert the image of the subject into the electric signal faster than the CCD does, and thus, the photographing time of the subject can be reduced.

The elastic pad 130 is disposed between the base member 110 and the photographing device 120, and the elastic pad 120 is formed of a silicon-based resin having an elasticity. A surface of the elastic pad 130 contacts the filter 150, and the other surface of the elastic pad 130 contacts the photographing device 120. The elastic pad 130 has a predetermined elasticity, which allows an operator easily adjust position of the photographing device 120 when the operator sets the position of the photographing device 120. Then, the operator can set the position of the photographing device 120 using the elastic pad 130 so that the photographing device 120 can have an optimal resolution.

The elastic pad 130 is formed as a square loop having an empty center portion so that the image passing through the lens unit 112 can be easily imaged on the photographing device 120. Although the elastic pad 130 in this example is formed as the square loop, the elastic pad can have any suitable shape. Therefore, if the elastic pad is adhered onto at least a part of the boundary of the photographing device 120 and the optical image can be imaged on the photographing device 120, there is no specific shape required for the elastic pad. For example, the elastic pad may be formed as a circular loop or discontinuous arcs separated from each other at a predetermined interval.

The filter 150 is disposed between the lens unit 112 and the elastic pad 130. In this example, an infrared-ray blocking filter is used as the filter 150 in a thin film or a glass plate shape. Although a sheet of the infrared-ray blocking filter is used as the filter 150 in this example, two or more filters can be used, and there is no limitation as to the type of filter used. For example, the filter may be an ultraviolet ray blocking filter, or a color calibration filter. In addition, even when one sheet of filter is used, the filter may include a plurality of layers having different functions from each other.

In addition, a flexible printed circuit board (FPCB) 161 is disposed on a lower surface and a side surface of the photographing device 120. The FPCB 161 is electrically connected to the photographing device 120 to transmit the electric image signals output from the photographing device 120 to an image processor (not shown) in the photographing apparatus 100. The FPCB 161 includes a conjunction portion 161a and a connection portion 161b. The conjunction portion 161a is directly connected to the photographing device 120 using a soldering process, and the connection portion 161b is connected to the conjunction portion 161a to transmit the electric signal.

A reinforcing plate 162 is disposed on a lower portion of the conjunction portion 161a. The reinforcing plate 162 is formed of a thin metal plate or a synthetic resin plate to be attached onto the conjunction portion 161a, and thereby protecting the conjunction portion 161a and supporting the photographing device 120. The reinforcing plate 162 includes two mounting holes 162a symmetrically, and the mounting hole 162a is inserted into the boss 113 when the photographing apparatus 100 is assembled so as to guide the reinforcing plate 162, the conjunction portion 161a, and the photographing device 120 disposed on the conjunction portion 161a.

In this example, the conjunction portion 161a that is a part of the FPCB 161 is disposed on the lower surface of the photographing device 120. However, if leads of the photographing device are disposed on the side surfaces of the photographing device, the conjunction portion of the FPCB can be disposed only on the side surface of the photographing device, and then, the conjunction portion of the FPCB may not be disposed on the lower surface of the photographing device 120.

Also, in this example, the reinforcing plate 162 is disposed on the lower portion of the photographing device 120. However, the structure for mounting the photographing device may not include the reinforcing plate.

Figure 5:
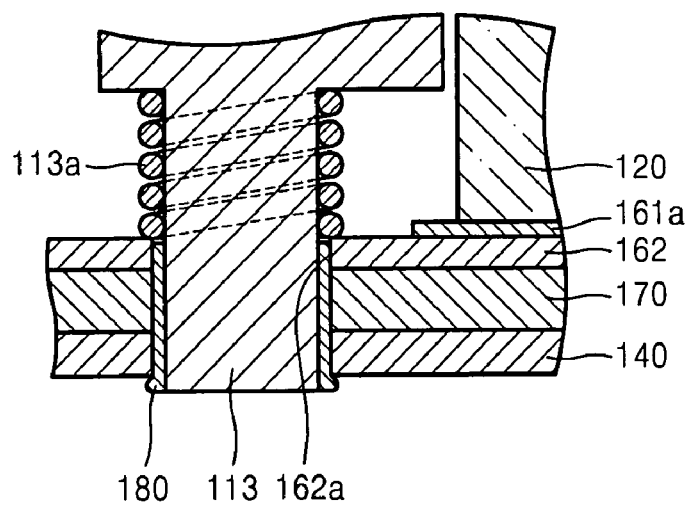
FIG. 5 is a partial cross-sectional view of a modified example of the structure for mounting the photographing device according to the embodiment of the present invention.

In addition, according to this example, a spring is not disposed on the boss 113 located between the base member 110 and the fixing member 140. However, as shown in FIG. 5, a spring 113a surrounds the boss 113, and an end of the spring 113a is located on a boundary of the mounting hole 162a, and thus, the elastic force can be reinforced and the photographing device 120 can be set easily. In this case, the spring 113a may be a cylindrical coil spring that can be easily inserted into the boss 113.

In addition, a heat dissipation plate 170 is disposed on a lower surface of the reinforcing plate 162. The heat dissipation plate 170 is formed of a material having high thermal conductivity such as an aluminum, and thus, dissipates the heat generated by the photographing device 120 efficiently.

The heat dissipation plate 170 includes two symmetric holes 170a, and the holes 170a are respectively inserted into the bosses 113 to guide the heat dissipation plate 170. A material for thermal conduction is not disposed between the reinforcing plate 162 and the heat dissipation plate 170 in this example. However, a thermal grease or a thin heat dissipation sheet may be disposed between the conjunction portion of the FPCB and the heat dissipation plate.

In addition, in this example, the heat dissipation plate 170 is disposed between the photographing device 120 and the fixing member 140. However, the structure for mounting the photographing device may not include the heat dissipation plate. In this case, the reinforcing plate and the fixing member may directly contact each other, and if there is no reinforcing plate and the conjunction portion of the FPCB is located on the side surface of the photographing device, the photographing device and the fixing member may directly contact each other.

In addition, the fixing member 140 is disposed on a lower surface of the heat dissipation plate 170. The fixing member 140 includes a base portion 141 and a supporting portion 142. The base portion 141 includes installation holes 141a and setting holes 141b. The installation hole 141a is inserted into the boss 113 of the base member 110 to guide the fixing member 140, and the setting hole 141b, to which an adjusting member 193a is inserted in a final assembling process of the photographing device 120 on a setting die, is used to set the photographing device 120 onto an optimal position.

In this example, two installation holes 141a are formed symmetrically, and four setting holes 141b are formed. However, there is no limitation in the number of the installation holes and the number of setting holes according to the present invention. However, the number of installation holes 141a may be equal to the number of bosses 113 of the base member 110, and the number of setting holes 141b may be equal to the number of the adjustment member 193a formed on an adjustment screw jig 193.

In this example, four supporting portions 142 are formed on corners of the fixing member 140, and each of the supporting portions 142 includes an opening 142a. The opening 142a is formed as a slot so as to be caught by the projection 114. Here, since the opening 142a is formed as the slot, the uppermost end of the opening 142a is caught by the projection 114.

The four supporting portions 142 are formed symmetrically according to this example. However, there is no limitation in the number of the supporting portions 142. However, the number of the supporting members 142 may be equal to the number of projections 114. Therefore, the structure of the openings 142a and the projections 114 according to the current embodiment allows the fixing member 140 to be fixed on the base member 110 easily.

In order to fix the fixing member 140 on the base member 110, the projections 114 are inserted into the openings 142a by pushing the heat dissipation plate 170, and then, the fixing member 140 presses the heat dissipation plate 170, the heat dissipation plate 170 presses the reinforcing plate 162, and the reinforcing plate 162 presses the photographing device 120. The pressed photographing device 120 pushes the elastic pad 130, and thus, the elastic pad 130 is transformed by the pressing force. Since the transformed elastic pad 130 has the elasticity, the fixing member 140 can be firmly fixed on the base member 110 by the elasticity, and thus, the photographing device 120 is also fixed temporarily.

In addition, in order to set the photographing device 120 and fix the photographing device 120 on the base member 110, an adhesive is applied onto the installation holes 141a so as to be disposed between the bosses 113, the mounting holes 162a, and the holes 170a. The adhesive 180 is an ultraviolet-ray curing adhesive. The adhesive 180 is applied between the bosses 113 and the mounting holes 162a, and the holes 170a for temporarily curing. Then, the position of the photographing device 120 is accurately set using the optical system, and the ultraviolet ray is irradiated to cure the adhesive 180 completely.

In this example, the ultraviolet-ray curing adhesive is used as the adhesive 180. However, any kind of adhesive that can align and fix the positions of the photographing device and the fixing member can be used. If a general solvent evaporating adhesive is used, the adhesive is easily cured when the aligning time increases, and thus, an optical curing adhesive, in particular, the infrared ray curing adhesive or the ultraviolet ray curing adhesive may be used.

In addition, according to this embodiment, the adhesive 180 is used to finally fix the photographing device 120. However, the fixing member 140 can be fixed on the base member 110 to fix the photographing device 120 temporarily instead of fixing the photographing device 120 using the adhesive. In this case, since the photographing device is not separately fixed using the adhesive, more accurate processing and assembling processes must be performed in order for the photographing device 120 to have the optimal resolution.

A example of a method for mounting the photographing device 120 according to an embodiment of the present invention will now be described. An operator disposes the photographing device 120 on the conjunction portion 161a of the FPCB 161, and disposes the reinforcing plate 162 on the lower portion of the conjunction portion 161a. Then, the operator inserts the bosses 113 into the mounting holes 162a of the reinforcing plate 162 while disposing the filter 150 and the elastic pad 130 between the lens unit 112 and the photographing device 120. The operator then inserts the bosses 113 into the holes 170a of the heat dissipation plate 170.

Next, the operator inserts the bosses 113 into the installation holes 141a of the fixing member 140, and inserts the projections 114 into the openings 142a of the supporting portions 142 while pushing the heat dissipation plate 170 to fix the fixing member 140 on the base member 110. The operator then applies the adhesive 180 onto the installation holes 141a so that the adhesive 180 is temporarily cured between the bosses 113 and the mounting holes 162a, and the holes 170a. In this example, the adhesive 180 is applied through the installation holes 141a after fixing the fixing member 140 by inserting the projections 114 in the openings 142a of the supporting portions 142. However, the adhesive 180 can be applied in advance, before fixing the fixing member 140.

Figure 6:
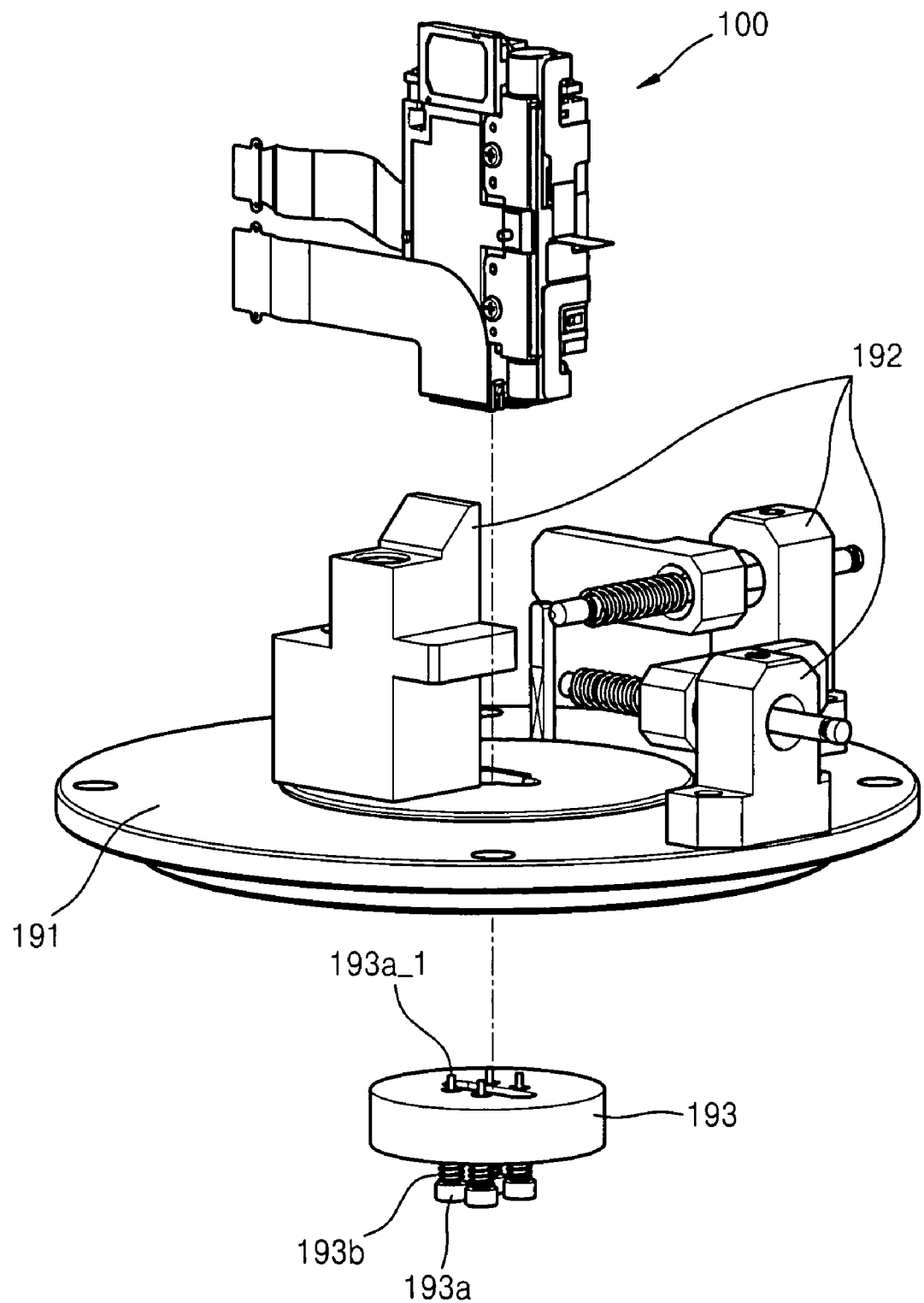
FIG. 6 is an exploded perspective view of an example of a manner in which the photographing device is positioned on a setting die for fine adjustment after fixing a fixing member on a base member in the photographing device according to the embodiment of the present invention.
Figure 7:
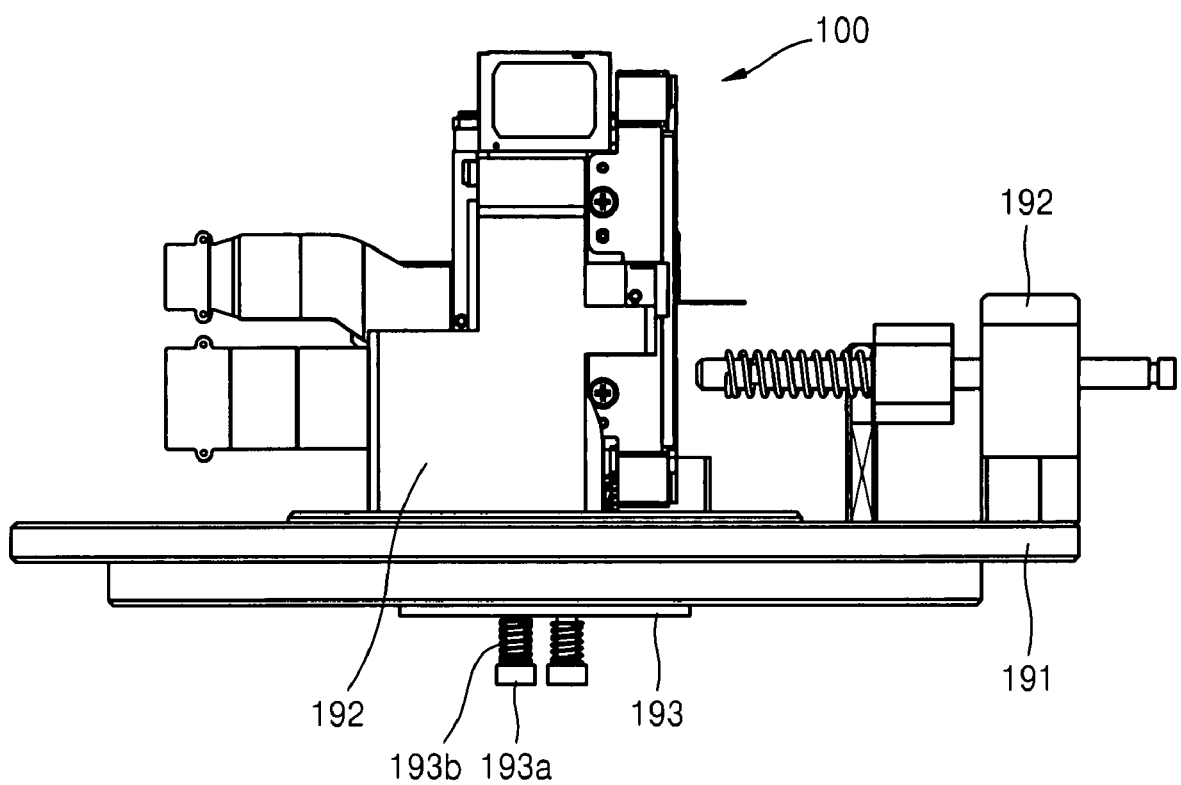
FIG. 7 is a front view of the photographing device positioned on a setting die for fine adjustment after fixing a fixing member on a base member in the photographing device as shown in FIG. 6 according to the embodiment of the present invention.

Then, as shown in FIGS. 6 and 7, the photographing apparatus 100 in the assembling process is located on a setting die 191, and the photographing apparatus 100 is fixed using a setting jig 192. Specifically, FIG. 6 is an exploded perspective view of a status where the photographing apparatus in the assembling process for fine adjustment is located on the setting die after fixing the fixing member of the photographing apparatus on the base member, and FIG. 7 is a front view of the status shown in FIG. 6. End portions 193a_1 of adjustment members 193a pass through the setting holes 141b to be located on the lower surface of the heat dissipation plate 170. The adjustment member 193a is installed on the adjustment screw jig 193, and an adjustment spring 193b is inserted around the adjustment member 193a.

Then, the operator moves the heat dissipation plate 170 and the photographing device 120 in upper and lower directions by adjusting the adjustment members 193a in order to find the position where the photographing device 120 has the optimal resolution. If the photographing device 120 moves upward, the elastic pad 130 is compressed, and if the photographing device 120 moves downward, the elastic pad 130 that is compressed is recovered by the elastic force. When the optimal position of the photographing device 120 is determined using the above processes, the ultraviolet ray is irradiated to cure the adhesive 180 completely, and thus, to fix the photographing device 120.

According to the apparatus for mounting the photographing device according to the embodiments described herein, the photographing device 120 can be mounted using the structure including the base member 110, the elastic pad 130, and the fixing member 140. Therefore, the photographing device 120 can be fixed onto the base member 110 in a simple way without using the screw coupling process.

In addition, according to the method for mounting the photographing device according to the embodiments described herein, accurate centering and aligning of the photographing device 120 can be achieved.

As further described above, according to the apparatus and method for mounting the photographing device according to the embodiments of the present invention described herein, the photographing device can be mounted without using the screw coupling process, and the position of the photographing device can be finely adjusted in order to obtain the optimal resolution.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for mounting a photographing device, the apparatus comprising:
    a base member including at least a lens unit;
    a photographing device for converting light transmitted through the lens unit into an electric signal;
    an elastic pad disposed between the base member and the photographing device; and
    a fixing member supported by the base member to fix the photographing device, the fixing member including an adjustment element for adjusting a mounting position of the photographing device along a direction toward the lens unit.

2. The apparatus of claim 1, wherein the base member includes a lens barrel, and the lens unit is disposed in the lens barrel.

3. The apparatus of claim 1, wherein at least one filter is disposed between the lens unit and the photographing device.

4. The apparatus of claim 1, wherein the elastic pad includes a synthetic resin.

5. The apparatus of claim 1, wherein the elastic pad is adhered to at least a part of a boundary of the photographing device.

6. The apparatus of claim 1, wherein a heat dissipation plate is disposed between the photographing device and the fixing member.

7. The apparatus of claim 1, wherein the base member includes at least one projection, and the fixing member includes at least one supporting portion which has an opening hooked by the projection.

8. The apparatus of claim 1, wherein the base member includes at least one boss protruding towards the fixing member, and the fixing member includes at least one installation hole into which the boss is inserted.

9. The apparatus of claim 1, wherein if the photographing device is temporarily fixed by the fixing member to the base member, the photographing device is finally fixed to the base member by an adhesive.

10. The apparatus of claim 9, wherein the adhesive includes an ultraviolet-ray curing adhesive.

11. The apparatus of claim 1, wherein the adjustment element includes at least one setting hole for adjusting the mounting position of the photographing device.

12. The apparatus of claim 1, wherein the adjustment element includes at least one setting hole for adjusting the mounting position of the photographing device in a first direction wherein the elastic pad is compressed and in a second direction wherein the elastic pad is recovered by an elastic force until an optimal position of the photographing device is determined.

13. A method for mounting a photographing device, the method comprising:
    preparing a base member including at least one lens unit;
    disposing a photographing device so that light of an image incident from the lens unit can be imaged on the photographing device;
    disposing an elastic pad between the lens unit and the photographing device;
    fixing a fixing member on the base member in order to fix the photographing device;
    forming an adjustment element on the fixing member for adjusting a mounting position of the photographing device; and
    adjusting the mounting position of the photographing device along a direction toward the lens unit using the adjustment element.

14. The method of claim 13, wherein if the base member includes at least one projection and the fixing member includes at least one supporting portion including openings corresponding to the projection, the opening is hooked by the projection when fixing the fixing member to the base member.

15. The method of claim 13, wherein forming an adjustment element includes forming at least one setting hole on the fixing member, and
    adjusting the mounting position of the photographing device includes adjusting the mounting position using the at least one setting hole so that the photographing device can function at the optimal resolution.

16. The method of claim 13, wherein the fixing comprises:
    temporarily fixing the photographing device to the base member using the fixing member; and
    fixing the photographing device finally using an adhesive after adjusting the position of the photographing device so that the photographing device can function at an optimal resolution.

17. The method of claim 16, wherein the adhesive includes an ultraviolet-ray curing adhesive, and is cured by ultraviolet rays in the final fixing process of the photographing device.

18. The method of claim 13, wherein the base member includes a lens barrel, and the method further comprises disposing the lens unit in the lens barrel.

19. The method of claim 13, further comprising:
    disposing at least one filter between the lens unit and the photographing device.

20. The method of claim 13, wherein forming an adjustment element includes forming at least one setting hole on the fixing member, and
    adjusting the mounting position of the photographing device includes adjusting the mounting position using the at least one setting hole in a first direction wherein the elastic pad is compressed and in a second direction wherein the elastic pad is recovered by an elastic force until an optimal mounting position of the photographing device is determined.

21. An apparatus for mounting a photographing device, the apparatus comprising:
- a base member including at least a lens unit;
- a photographing device for converting light transmitted through the lens unit into an electric signal;
- an elastic pad disposed between the base member and the photographing device; and a fixing member supported by the base member to fix the photographing device,
- wherein at least one spring is disposed between the base member and the fixing member.

22. A method for mounting a photographing device, the method comprising:
- preparing a base member including at least one lens unit;
- disposing a photographing device so that light of an image incident from the lens unit can be imaged on the photographing device;
- disposing an elastic pad between the lens unit and the photographing device; fixing a fixing member on the base member in order to fix the photographing device; and
- disposing at least one spring between the base member and the fixing member.

23. An apparatus for mounting a photographing device, the apparatus comprising:
- a base member including at least a lens unit;
- a photographing device for converting light transmitted through the lens unit into an electric signal;
- an elastic pad disposed between the base member and the photographing device; and
- a fixing member supported by the base member to fix the photographing device, the fixing member including an adjustment element for adjusting a mounting position of the photographing device,
- wherein the base member includes at least one boss protruding towards the fixing member, and the fixing member includes at least one installation hole into which the boss is inserted, and
- wherein the fixing member is finally fixed to the base member by an adhesive applied onto the at least one installation hole into which the at least one boss is inserted such that the photographing device is finally fixed in an optimal mounting position.

24. A method for mounting a photographing device, the method comprising:
- preparing a base member including at least one lens unit;
- disposing a photographing device so that light of an image incident from the lens unit can be imaged on the photographing device;
- disposing an elastic pad between the lens unit and the photographing device;
- fixing a fixing member on the base member in order to fix the photographing device;
- forming an adjustment element on the fixing member for adjusting a mounting position of the photographing device;
- adjusting the mounting position of the photographing device using the adjustment element; and
- finally fixing the fixing member to the base member by an adhesive applied onto at least one installation hole of the fixing member into which at least one boss protruding from the base member is inserted, such that the photographing device is finally fixed in the optimal mounting position.

\* \* \* \* \*